United States Patent [19]

Batdorf

[11] 4,347,285
[45] Aug. 31, 1982

[54] CURABLE AQUEOUS SILICATE COMPOSITION, USES THEREOF, AND COATINGS OR LAYERS MADE THEREFROM

[75] Inventor: Vernon H. Batdorf, Minneapolis, Minn.

[73] Assignee: H. B. Fuller Company, St. Paul, Minn.

[21] Appl. No.: 238,642

[22] Filed: Feb. 26, 1981

[51] Int. Cl.³ .................. B32B 9/04; B32B 9/06; B05D 3/02
[52] U.S. Cl. ............................ 428/332; 106/74; 106/84; 427/388.4; 427/393; 427/393.3; 427/393.6; 427/397.8; 428/446; 428/450; 524/8; 524/417
[58] Field of Search .............. 260/29.6 S, 29.6 M; 427/385.5, 388.4, 393, 393.3, 393.6, 397.8; 428/446, 450, 332; 524/8, 417; 106/74, 84

[56] References Cited
U.S. PATENT DOCUMENTS 4,267,089  5/1981  Brown .................. 260/29.6 X

*Primary Examiner*—Michael R. Lusignan
*Attorney, Agent, or Firm*—Merchant, Gould, Smith, Edell, Welter & Schmidt

[57] ABSTRACT

The disclosed aqueous binder system has a pot life of more than 15 minutes at room temperature and is normally stored as a two-part system. The first part comprises an alkali metal silicate, and the second part comprises a coreactant metal salt of marginal water solubility (at room temperature and neutral pH) which provides reactive divalent metal ions. A rubber latex is normally included in one or both parts, preferably the coreactant (second) part. Preferred coreactants are metal salts of Group II, A or B of the Periodic Table, particularly phosphates, carbonates, or borates of magnesium and zinc. A preferred method of application involves blending the two-part system, spraying it onto a surface, and permitting the sprayed material to cure to a water-resistant layer having a Barcol hardness of at least 10. A low density inorganic filler can be incorporated into the coating to reduce its density below 0.4 g/cc and to provide better insulative properties.

49 Claims, No Drawings

CURABLE AQUEOUS SILICATE COMPOSITION, USES THEREOF, AND COATINGS OR LAYERS MADE THEREFROM

TECHNICAL FIELD

This invention relates to aqueous silicate compositions which react with divalent metal compounds to form cured or crosslinked solids useful as protective coatings, as binders or matrixes for inorganic fillers (particularly of the expanded rock type), and other uses which call for a tough, hard, substantially fire-retardant coating or layer. An aspect of this invention relates to a two-part curable composition, one part containing a curable aqueous silicate and the other part containing the co-reactant or co-curative. Still another aspect of this invention relates to the resulting blend of the two parts which has a pot life of sufficient length to permit spraying of the blend under normal ambient conditions with conventional spray equipment. A further aspect of this invention relates to a method for protecting substrates such as steel and concrete, e.g. by providing the substrate with a relatively thick, low-density layer of fire-retardant material having heat insulative properties.

DESCRIPTION OF THE PRIOR ART

It would be difficult to provide even a survey of the materials now used in the building and construction trades to impart fire retardancy and thermal insulation properties to basic structural members or materials such as concrete and steel. A variety of both organic and inorganic insulative materials have been used for this purpose. Some of these materials are preformed into panels, blocks, blankets, or boards that are assembled in place on the job site. A normally less labor-intensive approach involves the use of spray-applied thermal insulation such as foamed synthetic organic polymers, including urethanes, urea-formaldehyde condensates, cellulosic polymers, and other thermoplastic or thermoset materials. The organic polymer foams present varying degrees of difficulty with respect to the introduction of fire-retardant properties. Either the polymer structure itself has to be altered to reduce flammability or some additive has to be blended with the polymer system so that the essentially organic coating will have less of a tendency to support combustion. Furthermore, organic polymers such as the urethanes decompose at high temperatures and give off toxic fumes. Given the present state of the art, it is ordinarily inappropriate to rely upon any of these organic materials to resist temperatures substantially above 205° C. (400° F.).

Inorganic thermal insulation can provide a degree of safety in relatively high temperature applications (e.g. above 1000° C.) as well as non-flammability at these temperatures. Not all inorganic thermal insulation is preformed into panels, blocks, or the like; spray-applied cement mixtures and the like are known and in commercial use. Absent a low-density filler, a typical inorganic insulation will have a specific gravity in excess of 2.0 (125 lbs. per cubic foot density), and, even when measures are taken to reduce density, it is not unusual for the specific gravity to be on the order of 0.4 (25 lbs. per cubic foot density). A thick coating with a density of 0.4 g/cc can add a considerable amount of weight to a wall or panel and may require special structural members as a price for dealing with this extra weight. In addition, the denser types of inorganic insulation may have a thermal conductivity in excess of 1 BTU inch/°F./ft$^2$/-hour ($3.445 \times 10^{-4}$ cal/cm-sec °C.). A thermal conductivity greater than about $3.4 \times 10^{-4}$ cal/cm-sec °C. may require a very thick layer of insulation to get the desired thermal resistance. Such thicknesses compound the weight problem mentioned previously. In addition, some cementitious insulation systems require that the surface of the applied layer be covered or kept moist for the first 24 hours of cure in order to prevent loss of moisture which is necessary for the hydration reactions taking place in the cement matrix.

A number of suggestions have been made regarding these problems. For example, it has been proposed that expanded rock particles (e.g. expanded perlite or vermiculite) be treated with acid and waterglass (an aqueous silicate). The thus-treated particles can be fed into cavities requiring thermal insulation, e.g. the cavities defined by wall panels and wooden or metal studs. Liquid coating compositions containing water as a base or vehicle, particulate silica, a silicate binder (e.g. sodium silicate in water), and a thermoplastic binder/thickener have also been proposed. An alkali metal fluorosilicate can be included in the liquid silicate composition to help dry the composition after it has been applied to a surface to protect against fire or rain. Spraying can be a mode of application with this system. Other known sprayable protective coating compositions (e.g. for steel) include cementitious mixtures containing a lightweight aggregate and a nonionic detergent which serves as a bubble-forming agent to impart a cellular structure, thereby reducing the density of the sprayed material.

Although the hydration reactions by which cementitious compositions are cured and the metal salt or oxide cocurative reactions by which liquid silicates are crosslinked are not fully understood, the patent and technical or scientific literature and other sources of information about these materials contain vast amounts of disclosure regarding techniques for hardening, curing, or modifying such materials. For example, it has been observed that more durable silicate paints can be made by adding very small amounts of heavy metal salts. It is also known that alkali metal silicates dissolved or dispersed in water react readily with salts or oxides of metals of Group II (A or B), III, IVB, VIIB, and VIII of the Periodic Table. It is known that aluminum, barium, calcium, magnesium, manganese, lead, and zinc form substantially neutral or mildly basic salts which provide a cocurative effect, typical of such salts being the carbonates and oxides. To provide storage stability, an alkali metal silicate component and a metal salt cocurative component can be supplied in separate packages and mixed just prior to application, thereby forming a self-curing liquid silicate composition which, at least for a short time, has a viscosity suitable for brushing or spraying. As in any two-part system, formulation of the system preferably takes into account the rate of cure after spraying (e.g. as evidenced by development of hardness and water resistance) and, at the same time, the pot life or stability of the blended system. Still other factors to be considered are the conditions of application and ultimate use, ultimately obtained thermal insulation and fire-retardant properties, resistance to cracking, speed of cure at normal ambient temperatures, techniques for reducing the density of the applied layer or coating, and the effect of other additives to the system, e.g. lightweight aggregates. A system which required several weeks to develop significant hardness at room temperature might be impractical if it were intended for application at a construction site. However, it could be equally impractical if the rate of cure at normal ambient temperatures was so fast that the pot life was extremely short, and the system would have to be applied very quickly after mixing. The opposite extreme would be a composition which did not develop water resistance or hardness without the aid of elevated temperatures or post-added ingredients; such compositions would typically be suitable only for manufacture of preformed or pre-coated structural members.

The following U.S. patent references are believed to contain disclosures which are illustrative of the state of the art.

| U.S. Pat. No. | Patentee | Issue Date |
|---|---|---|
| 3,297,616 | Fisher et al | January 10, 1967 |
| 3,819,388 | Cornwell | June 25, 1974 |
| 4,000,241 | Dunn | December 28, 1976 |
| 4,041,000 | Farcnik | August 9, 1977 |
| 4,125,651 | Campbell et al | November 14, 1978 |

SUMMARY OF THE INVENTION

It has now been found that a room temperature-curable aqueous silicate composition can be formulated from an aqueous solution or colloidal dispersion of an alkali metal silicate (preferably in a first part) and at least one metal salt of a divalent cation (preferably in a second part), and the metal salt can be selected to provide good curing of the alkali metal silicate composition at room temperature and in relatively thick coatings, without excessive sacrifice of pot life. After the alkali metal silicate has been blended with the metal salt cocurative (which is preferably a combination of metal salts), the resulting self-curing mixture will remain reasonably stable in viscosity at normal ambient temperatures for a period long enough to permit spraying onto a substrate or similar modes of application.

Although this invention is not bound by any theory, it is presently believed that two factors can have a major bearing upon the selection of the metal salt cocurative. One of these factors is reactivity with alkali metal silicates, the lighter metals of Group II-A of the Periodic Table being generally the most reactive and the metals of Group II-B being relatively less reactive. Another factor is solubility in neutral or basic aqueous media. This latter factor poses some problems of terminology, since the preferred metal salt cocuratives of this invention might be considered to be "insoluble" in some contexts of inorganic chemistry, particularly since their solubilities are not easily measurable by crude or gross techniques which become insensitive or inaccurate at levels below 1% by weight. (Fortunately, there are long-standing techniques in the art for measuring the "solubility product" and calculating water solubilities for compounds which dissolve in water only to the extent of a tiny fraction of a percent.)

Briefly stated, an aqueous silicate composition of this invention which is self-curing at room temperature comprises:
(a) an aqueous solution or, preferably, colloidal dispersion of the alkali metal silicate;
(b) an aqueous latex comprising elastomeric latex particles stably distributed in an aqueous medium; and
(c) the metal salt of a divalent cation (the metal salt component being preferably a combination of salts) this metal salt component including at least one metal salt having a water solubility ranging from $10^{-1}$ to $10^{-4}$ weight-% at room temperature; provided that:
if the water solubility is greater than $10^{-2}$ weight-%, any divalent metal cation of the metal salt is less reactive with alkali metal silicates than calcium ion, and
if the water solubility is less than $10^{-3}$ weight-%, a divalent cation of the aforementioned metal salt is more reactive with alkali metal silicates than is −325 U.S. mesh ZnO.

As will be apparent from the foregoing discussion, the metal salt component includes a metal salt having a reactivity with alkali metal silicates at least equal to the cations of metals of Group II, A or B, of the Periodic Table, the most preferred salts being capable of providing magnesium ions in extremely small concentrations—on the order of the water solubility range defined previously. Optimum results appear to be obtained with a combination of a magnesium phosphate with at least one other magnesium salt, particularly magnesium carbonate.

When a metal salt cocurative is selected according to the principles of this invention, a 10 mm-thick coating of the self-curing composition becomes water resistant and develops a Barcol hardness (ASTM D 2583) of at least 10 at its exposed or top surface after 14 days of curing at room temperature (e.g. 20°–25° C.). In addition, the pot life of the self-curing composition will be at least 15 minutes, more typically at least 30 minutes, at room temperature. That is, the composition will have a reasonably stable viscosity for this period of time—stable enough to permit spraying—or other methods of application in which the viscosity cannot be excessively high.

For long-term storage stability, compositions of this invention are divided into two separately packaged parts, the alkali metal silicate being in the first part and the coreactant or cocurative being in the second part. The latex can be included in either or both parts; in the typical practice of this invention, the latex is introduced into the second or coreactant part. The two parts can be blended together and sprayed onto concrete, steel, wood, etc. with conventional spray equipment. A lightweight aggregate or fire-resistant inorganic filler can be introduced into the two-part system prior to spraying or can be simultaneously sprayed from a different sprayhead along with the two-part self-curing silicate of the invention. The filled, sprayed coating can have a density less than 0.4 g/cc and can develop a significant amount of its ultimately-obtained hardness in about 16 hours at ambient temperatures. (Cure times in excess of 24 hours are nevertheless preferred.) The cured coatings or layers are suitable for both on-site application and for fabrication into preformed structural members, typical cured layers being at least about 1.5 mm thick, being highly crosslinked, non-efflorescing, and resistant to attack by water.

DETAILED DESCRIPTION

Liquid silicates (particularly of the waterglass type) have been used to provide silicate coatings and layers for many years. It is well known in the art that these layers or coatings may be permeable or porous. Furthermore, the alkali metal silicates have a degree of compatibility with water, regardless of the silica/alkali metal oxide ratio, and thus can be attacked or solvated by water. An important breakthrough in this art resulted when it was recognized that the silicate coatings can be rendered insoluble and resistant to rehydration with water. According to the teachings in this art, the more completely the water is removed from the silicate, the greater will be its resistance to rehydration. Since the amount of moisture retained by a silicate coatings is affected by the temperature to which it has been subjected, air or ambient temperature drying has not been heavily relied upon by those skilled in the art, particularly when the coating will be exposed to weather. Thus, baking has commonly been used to "cure" the silicate coating, e.g. by slowly increasing the temperature to 95°–100° C. to remove excess water slowly, followed by a relatively strong heat treatment at about 150°–200° or even 210° C. Such "curing" with heat alone does not necessarily produce radical chemical changes in the silicate, but it is well known that "setting agents" or cocuratives or coreactants may be used to improve the moisture resistance through chemical reactions between the cocurative and the silicate. According to the theory of "chemical" curing, almost any acidic or heavy metal compound will react with the silicate. However, such reactions have historically been considered to be very rapid, and a common practice has been to add cocuratives or coreactants as an after-treatment. Salts which readily ionize, such as calcium chloride, magnesium sulfate, aluminum sulfate, borax, and sodium metaborate are typical of these coreactants. They have been applied in dissolved form, e.g. as 5–10% solutions.

It is also known that some setting agents dissolve very slowly in water. Some of these agents, when mixed with liquid silicates, make a silicate mixture of reasonably good working life or pot life. Known examples of setting agents or cocuratives which do not produce instantaneous curing include the silica fluorides, especially the sodium salt, and finely divided zinc oxide. When zinc oxide is used as a coreactant or cocurative, it is not unusual to heat the silicate coating to about 100° C., while sodium silica fluoride may be employed at ambient temperatures. Insolubilizing agents which react with silicates at much higher temperatures (e.g. above 200° C.) are also known. Examples of these include clays and minerals which heat-decompose into acidic components.

Although elevated temperatures can be used to cure silicates formulated according to the teachings of this invention, it is preferred that significant hardening and water resistance be at least attainable at normal ambient temperatures. Zinc oxide and oxides generally are not preferred for use in this invention, unless they are combined with other cocuratives which will be described subsequently. According to most chemical handbooks, zinc oxide has a solubility in cold water which is less than about $2 \times 10^{-4}$ weight-% at a pH of 7.0. In order to be useful in this invention as a primary cocurative, compounds of such marginal solubility should provide divalent cations with greater reactivity than ZnO. Even magnesium oxide, which is reported to have a solubility in cold water more than three times as great as that of zinc oxide (a typical value given in chemical handbooks being 0.00062 grams in 100 parts of water), is relatively slow compared to optimum cocuratives such as the magnesium phosphates and magnesium carbonate. To further illustrate this point, zinc carbonate is reported to have a solubility in cold water which is roughly 0.001 weight-%. This solubility is almost an order of magnitude larger than that of zinc oxide and is even larger than magnesium oxide. Nevertheless, zinc carbonate would not be relied upon in the context of this invention to provide the primary curing effect; normally, if used at all, this salt would be combined with a magnesium salt of greater solubility than magnesium oxide.

As a general rule of thumb in the practice of this invention, carbonates and phosphates of low solubility, and other salts of low solubility which are nevertheless readily ionizable are preferred over oxides such as MgO, which has a greater degree of covalent character. A salt such as tribasic magnesium phosphate, non-hydrated or in any of its hydrated forms, it typically rather insoluble. The tetrahydrate of $Mg_3(PO_4)_2$, i.e. the tetrahydrate of the tribasic magnesium salt of orthophosphoric acid is reported to have a water solubility on the order of $2 \times 10^{-2}$ weight-%. The monobasic trihydrate is only slightly higher in water solubility. Despite these rather marginal solubilities, the salts themselves have very little covalent character and can be expected to dissociate more or less completely into divalent magnesium ions and phosphate ions as they dissolve in water. This behavior would probably not be obtained with a more covalent magnesium salt of substantially the same degree of water solubility. Although this invention is not bound by any theory, it is believed that the ionic form of magnesium metal is more active in crosslinking alkali metal silicates than is a more covalently bonded form of this metal.

At the other end of the spectrum, some alkaline earth metal salts normally considered "insoluble" are either too soluble or too reactive in the context of this invention, a typical example being calcium sulfate, which is reported to dissolve to the extent of about 0.24 grams in 100 parts of cold water. Even tricalcium orthophosphate and other calcium phosphates (such as the pyrophosphate) which are less soluble than calcium sulfate may be too reactive in the context of this invention under some conditions. In this connection, it should be noted that the water solubility of tricalcium orthophosphate is reported to be only about $2.5 \times 10^{-3}$ weight-%.

In short, it has been discovered that the divalent metal cations in approximately the middle of Group II-A of the Periodic Table have the highest reactivity with the alkali metal silicates, particularly as crosslinking agents. Foremost among these cations are $Ca^{++}$ and $Mg^{++}$, the divalent calcium ion being considerably more reactive than its magnesium cousin. Divalent barium cations appear to be relatively slow in their reactivity as compared to either $Mg^{++}$ or $Ca^{++}$. The salts of Group II-B metals are typically less reactive (in the context of this invention) as compared to, for example, $MgCO_3$ or its double salts, with the apparent exception of the more soluble zinc borates and phosphates. The following Table sets forth typical guidelines for the selection of readily ionizable cocurative metal salts of this invention.

| Solubility in Weight % | Cation of Metal Salt |
| --- | --- |
| about $10^{-1}$ | $Zn^{++}$, $Ba^{++}$ |
| $10^{-2}$ to $10^{-1}$ | $Mg^{++}$, $Zn^{++}$ |
| $10^{-3}$ to $10^{-2}$ | $Ca^{++}$, $Mg^{++}$, $Zn^{++}$ |
| $10^{-4}$ to $10^{-3}$ | $Ca^{++}$ |

As noted previously, it is particularly preferred that at least one of the anions present be a phosphate, preferably the orthophosphate ($PO_4^{---}$), although similar types of phosphates such as the condensed phosphates (e.g. pyrophosphate) are technically operative. It is a particularly surprising feature of this invention that the combination of magnesium carbonate with a magnesium phosphate appears to produce a synergistic effect wherein the pot life is adequate and the cure is sufficiently rapid, but, in addition, hardness and moisture resistance develop very rapidly during a room-temperature cure.

When two-part systems of this invention are blended together to form a self-curing silicate composition and then further blended or co-sprayed with vermiculite, perlite, mineral wool, glass foam or fibers, or other inorganic fillers with heat resistant properties, coatings and layers with excellent strength characteristics are obtained, and these strength characteristics (e.g. compressive strength) are not appreciably lost after exposure to temperatures above 200° C., 400° C., 600° C., or even 750° C. In addition to applications at construction job sites, compositions of this invention can be used to make insulative sleeves (e.g. for steam lines), roof insulation, storage tank insulation, sound insulation (e.g. for walls and ceilings), and other products for the building trades, including preformed panels. When an applied self-curing silicate of this invention is compressed between sheet-like substrates, a wallboard similar to gypsum wallboard is obtained. This wallboard is, like the gypsum-containing material, nailable, and its lower density is believed to be advantageous. The Barcol hardness of a layer of cured material of this invention typically exceeds 20 on its top surface, and hardnesses in excess of 30 are readily obtained after 14 days of curing and drying at normal ambient temperatures. Upon completion of the 14-day cure, the hard, crosslinked silicate matrix will actually shed water. The pressure or stress measured at 33% compression typically exceeds 70 kilopascals (10 psi), and values in excess of about 280 kPa can be readily obtained in practice. When a low density filler or aggregate is combined with the silicate material (either by blending with the self-curing silicate binder of this invention or by co-spraying), layers having a density less than 0.35 g/cc and typically below 0.3 g/cc are readily obtained. After complete drying and curing, densities slightly below 0.15 g/cc have been obtained, particularly when less than about one-fourth of the weight of the sprayed layer (including lightweight aggregate) comprises the crosslinked silicate. Although the specific gravity of the solids dissolved or dispersed in aqueous liquid silicates have a specific gravity in excess of 2.0, a weight fraction of 25-95% low density aggregate (e.g. an expanded rock such as vermiculite or perlite) can drastically reduce the density of the aggregate/silicate combination to the very low levels described previously. These aggregates, being porous, also have a beneficial effect upon R values and K values. The thermal conductivity of the perlite-containing cured system is very similar to expanded perlite itself, i.e. 0.4 BTU-inch/hour/ft$^2$/°F. or about $1.4 \times 10^{-4}$ cal/cm-sec°C. A cured mineral wool-containing system can have values similar to dry mineral wool, i.e. 0.23 BTU-inch/hour/ft$^2$/°F. or about $0.8 \times 10^{-4}$ cal/cm-sec °C. These low values are obtained in part because of the surprisingly low binder demand, i.e. the ability to make self-curing silicate systems highly loaded with lightweight aggregate or other inorganic insulative materials and fillers. For example, each cubic meter of lightweight inorganic filler typically requires less than 80 kilograms of self-curing silicate binder, the exact amount depending upon the nature of the filler. For an expanded perlite-filled system, the demand can be less than about 45 kg for each cubic meter of perlite; in the case of mineral wool, the demand can be even lower, e.g. less than 35 kg/m$^3$.

When the two parts of a two-part system of this invention have been blended together, the resulting self-curing system, which can have a useful working life or pot life of 40-100 minutes can be diluted with water to reduce the viscosity for easy sprayability and also extend the pot life to greater than 120 minutes, suitable viscosities being less than 1000 centipoise (cps) but preferably greater than about 20 cps. The binder/low density mineral filler combination forms a reasonably smooth surface upon spraying and may be further compacted with a hand trowel for an even smoother finish. The amount of water dilution prior to spraying varies depending upon the nature of the mineral filler. When short cure times are needed, self-curing silicate binder systems of this invention can be formulated to provide a firm initial set in 2-10 hours and sufficient drying and water insolubility to be rain-resistant after about 16 hours of cure time. The cure time varies with ambient temperature as well as the drying rate of the water from the surface.

Self-curing silicate binder (the two-part system which has been blended together) is alkaline and ordinarily does not corrode steel or attack concrete. Priming of steel, concrete, and other surfaces is ordinarily unnecessary prior to spray application, since the self-curing silicate binder exhibits good adherence to these common structural materials. Shrinkage and cracking upon drying and curing do not appear to be significant problems with preferred systems, nor has efflorescence been observed. The coatings applied according to this invention tend to be acid resistant and can be applied in the form of a continuous layer, with no joints or overlaps. Due to the low density and rapid initial set time of the lightweight aggregate-filled material, the use of mechanical fasteners is ordinarily not necessary—the material will generally remain in place without such fasteners and structural aids. Elimination of mechanical fasteners is desirable, since these structural elements can reduce insulative value; similarly, the elimination of joint sealants and attachment adhesives is also beneficial in that it saves time and expense.

The acid resistance of insulative materials of this invention appears to be sufficient to provide some protection against exhaust gases and other acidic fluids, although the degree of permeability to exhaust gases is presently not known. It presently appears to be feasible to line smokestacks with the material to improve the heat resistance of the stack. In some cases, prolonged exposure to very high temperatures may cause some shrinkage due to loss of porosity of expanded rock fillers; however, the fire-resistant properties of the material are not necessarily damaged by such prolonged exposure and may even be enhanced. Preferred cured binder systems of this invention produce no toxic fumes under such elevated temperature conditions.

A particularly preferred use for a self-curing silicate binder/lightweight mineral filler system of this invention is in the insulation of tanks for storing very flammable liquids such as gasoline or hot liquids of any type, especially where surface temperatures of the tank can reach or exceed 150° C. In this field of use, the application of a seamless layer without previous priming (or application of attachment adhesive) can be particularly advantageous. The system can be formulated so that less than 24 hours of dry weather will be sufficient for curing of the layer or coating on the outside of the tank, even when the tank is fully exposed to outdoor conditions. The outdoor ambient temperature at the time of application should normally be above 0° C., more preferably above 5° C. Optimum ambient temperature conditions are above 15° C., there being essentially no upper limit on the ambient temperature unless some form of baking of the coating is used, in which case heating schedules commonly used in the prior art would preferably be followed. When indoor conditions are available for the initial cure and a baking cycle is nevertheless desired, there is no compelling need to carry out the initial cure at temperatures above room temperature (20°–25° C.) unless time is of the essence. Furthermore, rates of cure can be manipulated by controlling the level of dilution of the self-curing binder after the two parts have been combined. With no dilution whatever, the cure time is speeded up and the pot life nevertheless remains in a workable range. On the other hand, the pot life can be extended to as much as 4 hours with water dilution of the blended two-part system.

Once an insulative system of this invention has been cured, it can be resistant to subzero temperatures as well as elevated temperatures. Layers of insulation of this invention exposed to temperatures as low as −30° or even −40° C. showed no significant damage. At the upper end of the useful temperature range (e.g. 600°–815° C.), the performance of the inorganic insulative systems of this invention are, of course, superior to organic insulation such as polyurethane or polystyrene foam, yet thermal insulation or heat transfer values are similar or even superior to these materials. The K values have already been discussed. The R value of preferred insulative materials of this invention can be in the range of about 4 to 5—an improvement over some types of polystyrene foam. If desired, layers or coatings of cured insulative material of this invention can be further protected against water permeability or water absorption with overcoatings of a mastic, using either breathable or non-breathable mastic coatings which are commercially available. In addition to or instead of combining a self-curing silicate binder of this invention with expanded rock (e.g. perlite or vermiculite) or mineral wool, binders of this invention can be reduced in density by means of the incorporation or co-spraying with foamed glass or organic materials of low density such as the conventional fire-retardant cellulosic materials. Lightweight aggregates used to reduce density preferably have a mesh size suitable for spraying, e.g. −4 U.S. mesh, more preferably −8+100 mesh.

For convenience of application at a job site, it is ordinarily preferable to formulate a Part A (silicate-containing) and the Part B (cocurative or coreactant-containing) such that these parts (normally both liquids) can be blended together at the ratio of 1:1 by volume. However, other ratios have been used in the art of two-part binders, e.g. 0.5–3:1. When a 1:1 by volume A/B ratio is "built in" to the two-part system, it is preferred that the weight ratio be fairly close to the volume ratio, although the Part A will normally be somewhat denser and hence may weigh, for example, 20–50% by weight more than the Part B. Typical densities for a Part A can approach 1.5 g/cc, while the density of Part B will normally be closer to that of water, a typical value for Part B being within the range of 1.1–1.3 g/cc. The solids content of Part A is normally well above 30% by weight, the vehicle or carrier being essentially an aqueous medium. The solids content of Part B can be somewhat lower, although a solids content in excess of 30% by weight is not unusual here either. Much or all of the water content of Part A is provided by the aqueous medium in which the alkali metal silicate is dissolved or dispersed. A Part B of this invention, on the other hand, can be formulated by blending together the cocurative salt component with thickeners, surface active agents, a flame retardant (if desired), and similar ingredients in tap water. As noted previously, an aqueous latex can be introduced into Part A and/or Part B and is preferably present in at least one of these two parts. If present in Part A, the latex, having its own aqueous liquid carrier, will make a minor contribution to the aqueous carrier of Part A. In Part B, this contribution to the aqueous carrier is normally also a minor one.

When extension of the pot life or lowering of viscosity are desirable, a typical practice is to blend Part A and Part B components until uniform, and then dilute at once with at least about one volume of water for each two volumes of blend. Up to three volumes of water for each two volumes of blend can be used without significantly increasing the risk of developing shrinkage cracks during the curing of applied coatings or layers, even if these coatings or layers contain significant amounts of lightweight aggregate.

The two components preferred for use in this invention to provide two-part curable binder systems will now be described in greater detail.

The First or "A" (Silicate) Part

The most important ingredient of the first part or Part A of a two-part curable aqueous binder composition of this invention is the alkali metal silicate, which is uniformly distributed (dissolved or dispersed) in water. The alkali metal silicate itself is a chemical compound which can be obtained in dry powdered, or (particularly in the case of metasilicates and orthosilicates) dry crystalline form. However, there is no commercial advantage in obtaining these dry forms and then dispersing them or dissolving them in water. Colloidal alkali metal silicates are manufactured commercially by interacting silica sand and an alkali metal carbonate at high temperatures to produce a product which is most easily dispersed in water with the aid of steam by the manufacturer of the silicate. Particularly for the relatively high-silica silicates, it is generally more convenient to form the colloidal dispersions as part of the manufacturing process, since these silicates may be difficult to disperse in any other manner.

The structure of alkali metal silicates is not fully understood. For the sake of a convenient shorthand, most of these silicates are represented by the formula $M_2O \cdot nSiO_2$, wherein M represents the alkali metal (preferably sodium or potassium) and n represents the number of moles of silica for each mole of $M_2O$. In some of these formula notations, n represents a weight ratio, which of course can vary somewhat from the molar ratio, particularly when M is potassium. When n is 1.0, on a molar basis, the silicate (e.g. sodium or potassium metasilicate) appears to form true solutions in water rather than colloidal dispersions. The exact nature of these apparent true solutions is not understood with certainty. It may be assumed that neither silica or an alkali metal oxide as an isolated species is present in the solution, but rather a more complex, water-compatible inorganic species or combination of species. When n is at least about 1.6 on a molar basis, colloidal dispersions are the predominant form in which the silicate occurs in aqueous media. At temperatures above 0° C., these colloidal dispersions are very stable. These stable colloidal dispersions in aqueous media are the preferred form of alkali metal silicate used to formulate a Part A of this invention. The usual commercially available form of these dispersions is typically known as waterglass.

As pointed out in Shreve, The Chemical Process Industries, Second Edition, McGraw-Hill, New York, 1956, pages 280–282, silicates that have a silica/sodium oxide ratio of 1.6:1 up to 4:1 are called colloidal silicates, and at the present time there are over 40 varieties of commercial sodium silicates, each with a specific use. When the silica/sodium oxide weight ratio is, for example, 3.2:1, 43° Be. is the upper limit of concentration (40% solids). For a 2:1 silica/sodium oxide ratio (also by weight), the upper limit is 60° Be. or 54 weight-% solids. Concentrations up to about 65 weight-% solids are known, e.g. in the case of the 1.6:1 (weight/weight) silica/sodium oxide ratio. For the 3.75:1 weight ratio, the maximum concentration is 35° Be. or less than 33 weight-% solids. The extremely high Baume values can be reduced by diluting the commercially available form of the waterglass. Dilution to as low as 5% solids will not excessively interfere with formulation procedures, but the solids content of the waterglass is preferably on the order of 25–45% by weight when it is introduced into the Part A. Among the commercially available liquid sodium silicates are compositions varying in solids content from about 32% by weight to as high as 40% by weight. The silica/sodium oxide ratios of these materials, by weight, vary from as low as 2.54:1 to as high as 3.85:1 (Molar ratios would be slightly higher.) The viscosities of these commercially available grades are suitable for direct incorporation into a Part A of this invention, since viscosity values at 20° C. rarely exceed 400 cps and may even be less than 100 cps. Indeed, it is within the scope of this invention to add a small amount of a thickener to Part A to increase the viscosity of this predominantly liquid silicate material.

Aqueous potassium silicates are also available in silica/potassium oxide ratios above 2:1 and in Baume values above 25° Be. (All Baume values mentioned in the foregoing disclosure can be considered to have been determined at 20° C.)

Regardless of the weight ratio of silica to alkali metal oxide in the alkali metal silicate, the molar ratio (i.e. n in the foregoing formula for the alkali metal silicate) is preferably greater than 1.0, i.e. less alkaline than sodium or potassium metasilicate. The preferred value for n is 1.6 (molar basis) which works out to be more than 1.5 on a weight basis. The optimum value for n occurs within the range of 2 to 4. In the case of the potassium silicates, the weight ratios are lower for the same molar ratios, so that a silica/potassium oxide weight ratio above about 1.02:1 still provides some colloidal character and a weight ratio above 1.6:1 (silica/$K_2O$) is well into the colloidal silicate range.

Although up to 100% by weight of a Part A of this invention can comprise the aqueous colloidal dispersion of an alkali metal silicate, amounts as low as 50% by weight can be used to make room for other additives for reinforcing or strengthening of the silicate system, for reducing or preventing cracking upon drying and curing, for improvement of the water resistance of the cured system, for thickening or thixotropy or filler-suspension effects, or even for simple extension or dilution of the system. Some of these additives have been recognized as beneficial in the art of formulating silicate paints. For example, coatings of silicate paints are often quite rigid. Flexibility has been introduced into these coatings by adding rubber latices or latexes (discussed subsequently) and flake-like mineral fillers such as mica. In this invention, a minor but significant amount of the Part A composition can comprise mica flakes, e.g. 5–25% by weight. Other useful ingredients include salts and oxides which do not have a curative effect upon the alkali metal silicate at normal ambient temperatures. As noted previously, zinc oxide would not be used as the primary coreactant or cocurative in this invention, since reasonably rapid cures at normal ambient temperatures are desired. The mechanism by which zinc oxide can interact with the alkali metal silicates does not appear to come into play until moderately elevated temperatures are reached. Accordingly, it is entirely within the scope of this invention to include zinc oxide in Part A—not only because it does not bring about a premature cure, but also because it makes useful contributions to the cured silicate matrix or binder when a suitably reactive coreactant or cocurative is included in Part B. This is particularly likely to be the case when the zinc oxide has a sufficiently small particle size and sufficiently high surface area. Included in Part A, this oxide can greatly improve the water resistance of the two-part system upon curing. Very small amounts of zinc oxide (e.g. less than 1% by weight of Part A) are adequate to achieve this result.

Among the suitable thickeners or anti-settling agents included in Part A is zinc stearate, which also helps to improve the water resistance somewhat and to give the product more cohesiveness. In addition, this additive appears to help prevent the blended two-part binder from penetrating into the open pores of an expanded rock filler (e.g. perlite), which migration or penetration could result in local starvation of binder, particularly in view of the desired high loading of expanded rock or other mineral filler particles. The amount of zinc stearate needed to achieve this effect is also very small, e.g. less than 1% by weight of Part A. (The foregoing percentages of additives are based upon the weight of the Part A including liquid carrier for the silicate and are not based simply upon the solids content of Part A.)

The Second or "B" (Coreactant) Part

As noted previously, the major portion by weight of Part B can be water, which is used to disperse the cocurative metal salt component, various thickeners and surface active agents, a flame retardant chemical (if included), the latex (if included in this Part), and any miscellaneous ingredients which may be included to improve the overall performance of the system or to simply extend or dilute Part B. The only truly essential component of Part B is the metal salt coreactant, which preferably comprises a combination of salts of Group II (especially Group II-A), which have been selected in accordance with the principles described previously. This metal salt cocurative is suspended or dispersed in the aqueous liquid carrier of Part B, due to the extremely low water solubility of the component, i.e. less than about 0.1 weight-%. Introduction of certain reagents (e.g. mineral acids) could, of course, increase the water solubility of this metal salt component, but such introduction is not desirable and may even defeat some of the objectives of this invention. Accordingly, the relatively low water solubility of the metal salt or salts is preferably dealt with in an entirely different manner, e.g. with dispersion aids and/or agents to help prevent settling. The anti-settling effect is also useful with respect to inorganic insulative fillers such as mineral wool, perlite, vermiculite, etc. Small amounts of thickeners and thixotropes can have a useful viscosity-increasing effect. For example, less than two parts by weight of a suitable cellulosic thickener for each 100 parts by weight of water will produce a marked increase in viscosity. Other surface active agents (typically used in similarly small amounts) can be used to improve the dispersion of the coreactant metal salt component in the Part B. Defoamers can also be added to control foam; alternatively, the wetting agent used to improve dispersion of the coreactant component can also serve as a defoamer. Suitable wetting agents can confer the additional benefit of improving the wetting out of the substrate on which the two-part binder is applied, and quicker wetting of the mineral filler particles (perlite, mineral wool, etc.) may result as well. Preferred surface active agents are not significantly affected by alkaline conditions.

The latex referred to earlier is preferably an aqueous suspension or dispersion of <25 μM-size elastomeric particles which can improve the flexibility of the coating. Additional benefits of the latex include water resistance, resistance to cracking, improvement in film strength of the dry product, and the like. Elastomeric or rubbery latexes have been used in silicate paints, and the guidelines prevailing in the prior art provide useful suggestions for the amount of latex to be included in compositions of this invention.

A variety of synthetic elastomeric latices or latexes are commercially available, some of which are based upon polymerized diolefins such as butadiene and its copolymers, while others are based upon acrylates, polychloroprenes, vinyl or vinylidene polymers, and other readily available polymerized materials with elastomeric properties. Polyurethane latexes have been reported in the patent literature and have been commercially available on a sporadic basis. It is ordinarily inconvenient to concentrate the rubbery latex particles in the latex to more than about 80% by weight of solids, and even 60 or 70 weight-% solids levels may be difficult to achieve without some destabilization of the latex. Latexes can be diluted to almost any desired level, but there is no advantage in diluting to below 10 weight-% solids, at least in the context of this invention. The solids content of the latex will have an effect upon the amount included in Part B. Assuming a commercial or conventional solids level (e.g. 40-50% by weight), about 5-30% by weight of Part B will normally comprise the latex, so that Part B can contain about 2.5-15% by weight of latex solids.

The amount of Part B which will comprise the metal salt coreactant component can vary depending upon its solubility and its relation to the amount of silicate in Part A. To maintain the 1:1 volume relationshiop of A:B described previously, typical amounts of metal salt cocurative will exceed 5% by weight of Part B and may approach 20% by weight. Viewed from the standpoint of the amount of colloidal alkali metal silicate to be chemically interacted with the cocurative, the amount of this metal salt can be considered to be normally greater than one part by weight per 100 parts by weight of aqueous colloidal dispersion and can range up to about 50 parts by weight (on the same basis) for each metal salt ingredient of the metal salt cocurative component. On this parts per hundred (phr) basis with respect to aqueous colloidal dispersion of alkali metal silicate, the amount of latex will typically range from about 5 to about 25 phr. A more typical level of cocurative metal salt would be in excess of 5 phr on this basis, and when a combination of metal salts is used, the combined total will normally exceed 10 phr.

The aforementioned benefits of the zinc oxide can be enhanced by including a small amount of this compound in Part B, amounts less than 2% by weight of Part B ordinarily being effective for this purpose.

The Preferred Metal Salt Cocurative System

The first salt to be considered in a preferred cocurative system of this invention is a magnesium phosphate, the optimum choice of this class of compounds presently being the tribasic salt of $H_3PO_4$ in one of its hydrated forms, e.g. the octahydrate. Except insofar as it affects water solubility, the degree of hydration of the tri-magnesium phosphate (i.e. tri-magnesium orthophosphate) does not appear to be critical. The primary contribution of the tri-magnesium orthophosphate appears to be a marked increase in the rate of curing or gelation of the silicate. No significant efflorescence of soluble salts upon drying has been observed when magnesium orthophosphate has been used as the cocurative, even at high usage levels of the orthophosphate. Somewhat similar results can be obtained by replacing the tri-magnesium orthophosphate with zinc pyrophosphate or one of the zinc borates ($ZnO/B_2O_3$ ratios can vary) or combinations of these zinc salts. The mole soluble the "zinc borate" (hydrated zinc-boron double oxide), the greater its activity toward the alkali metal silicates.

A particularly desirable feature of $Mg_3(PO_4)_2 \cdot 8H_2O$ is the rather high level of development of hardness in the cured coatings.

A second element of the preferred combination of metal salts is magnesium carbonate (including its double salts and other complex salts, e.g. double salts with $Mg[OH]_2$), which helps to provide a good working life; a thorough cure leading to good strength characteristics, as with magnesium phosphate, shows no apparent efflorescence of soluble salts leaching out during drying and curing. The magnesium carbonate can be at least partially replaced with zinc carbonate, provided that the metal salt components as a whole has sufficient solubility and activity. Zinc carbonate may dissolve sufficiently in aqueous alkaline media, but the $Zn^{++}$ ion from this salt is believed to be somewhat less active toward alkali metal silicates than $Mg^{++}$.

The ratio of the fast-curing salt (e.g. the phosphate or borate) to the thorough-curing, water resistance-imparting salt (the carbonate) is not critical, although it is ordinarily preferred that the carbonate be present in the larger amount, a typical ratio (by weight) being within the range of 1.1:1 to about 2:1.

Other Ingredients

With respect to the two-part binder itself, there appears to be no pressing need for any other ingredients, although inert ingredients and modifiers may be present in minor amounts. With respect to the insulative and/or fire-resistant inorganic filler (which need not be incorporated into the binder and may be co-sprayed), the preferred materials are of the expanded rock type (e.g. expanded perlite, vermiculite, etc.), mineral wool, foamed glass, and other particulate materials having either a bulk or apparent density less than 0.4 g/cc, more typically less than about 0.3 g/cc. Where light weight is not an important consideration, relatively high density mineral fillers or pigments can be used.

Properties of Cured Systems

To provide a cured, lightweight aggregate-filled material which can be specified for service at temperatures up to about 815° C., it is desirable that any organic components of the composition be held to relatively minor levels. The organic thickeners, dispersion aids, defoamers, wetting agents, and other viscosity-altering or surface active agents typically used in this invention are effective in very small amounts, typically less than 1% by weight of the part (Part A or Part B) in which they are incorporated. These materials are not likely to have any substantial effect upon the fire-resistant properties of the cured binder. The elastomeric latex, on the other hand, is a much larger component of Part A and/or Part B, and the introduction of fire-retardant agents is desirable to impart fire retardancy to the latex solids, even though these solids typically comprise only a few percent of the total combined Part A/Part B system. One particularly preferred type of flame retardant is a high temperature reaction product of a metal silicate and antimony which provides antimony in a reactive form for very efficient use in a wide variety of polymer and coatings systems. Zinc borate has been suggested as a complete replacement for antimony oxide and other antimony compounds used as fire retardants. One formula of zinc borate has been reported to be $2ZnO.3B_2O_3.5H_2O$, although other ratios of zinc oxide and boric oxide are known in compounds of this type, e.g. $3ZnO.2B_2O_3$. These borates may be slightly soluble in water. Although this invention is not bound by any theory, it is believed that this slight solubility may contribute to their activity as cocuratives. Accordingly, a zinc borate can serve a double purpose in the context of this invention. The use of about 10 phr of fire retardant agent, based on the weight of the latex can be sufficient for the desired flame retardant effect.

Various inorganic components of the cured two-part binder system are believed to make their own incidental contribution to fire retardancy and/or absorption of heat, since endothermic reactions can occur in the cured binder (or at least in the cured binder/lightweight aggregate combination) at elevated temperatures, e.g. within the range of 95°-640° C. The completion of these endothermic reactions does not necessarily vitiate the desired properties of the cured binder/aggregate system, however; strength characteristics may be more or less unaffected or even enhanced, and K and R values may remain unaffected or adversely affected to a modest degree. (Typical R values of preferred cured binder/aggregate systems are on the order of 4 to 5.)

One apparent advantage of the preferred cocuratives of this invention is that they exert some sort of a buffering effect upon the alkali metal silicate component. As is known in the art, various divalent cations can displace the sodium or potassium ions in alkali metal silicates and thereby make possible the crosslinking of inorganic silicate polymer chains. In displacing these alkali metal cations, the effective pH of the cured system is probably reduced to a level closer to neutral—even the least alkaline of the high-silica alkali metal silicates typically have a pH above 8, and as the ratio of silica to alkali metal oxide approaches 1.0 on a molar basis, the pH moves upward toward 13. (The alkalinity of a Part A of a binder system of this invention may explain the apparent activity of zinc phosphates and zinc borates as curing agents. These zinc salts are more soluble in alkaline media than in neutral media. It is interesting to note that the same consideration applies to zinc oxide, but zinc oxide is not, by itself, a suitable cocurative for two-part binders of this invention, although it is useful in combination with other cocuratives. The amphoteric nature of these zinc compounds is believed to be less prevalent or even absent in the compounds of Group II-A metals.)

The principle and practice of this invention is illustrated in the following non-limiting Examples, wherein parts and percentages are by weight unless otherwise indicated. In these Examples, it should be noted that the term "carbonate" (as in magnesium carbonate or zinc carbonate) should be understood to include double salts and other multiple salts of the Group II metal carbonates, e.g. $4MgCO_3.Mg(OH)_2.5H_2O$. It also should be noted that the Group II salts used as cocuratives may contain impurities comprising other Group II metal salts or oxides, particularly when common commercial grades of these materials are used. The effect of such impurities is presently not known, but is believed to be negligible.

EXAMPLE 1

The formulations for the Part A and the Part B of a two-part binder system of this invention are set forth below. The binder became self-curing when Parts A and B were blended together at the ratio of 1:1 by volume (1.3:1 by weight). Once blended, the self-curing binder system had a useful life (pot life) of 30 minutes, undiluted, and two hours when diluted with water at the ratio of 3 volumes of water to each 2 volumes of binder.

In the formulations which follow, the ingredients are listed in their order of addition.

| Part A | |
|---|---|
| Ingredient | Weight % |
| Aqueous liquid sodium silicate, silica/sodium oxide ratio 3.22:1 (by weight), solids content: 38.3%; specific gravity at 20° C.: 1.401 (41.5° Be.); viscosity at 20° C.: 206 centipoises (cps) (Diamond Shamrock grade 40) | 81.22 |
| Water-ground muscovite mica (Franklin Mineral Products Company, Number 12 Alsibronz [trade designation]) | 18.32 |
| Zinc oxide (KADOX®-15, trademark of Gulf and Western for −325 mesh ZnO of 99.7% purity) | 0.15 |
| Zinc stearate (METASAP® Zinc Stearate H, trademark of Diamond Shamrock Corporation for −325 mesh zinc stearate of high purity) | 0.31 |

| Part B | |
|---|---|
| Ingredient | Weight % |
| Water | 67.06 |
| NATROSOL® 250 HHR (trademark of Hercules Corporation for water-soluble hydroxyethyl cellulose having an average number of moles of substitution of 2.5; 90% −40 mesh) | 0.52 |
| Magnesium carbonate (STAN-MAG® "light" magnesium carbonate, trademark | 9.32 |

-continued of Harwick Chemical Corporation,
99.5% −325 mesh; analysis
[ignited basis]: 41.8% MgO, 0.04%
$Fe_2O_3$, 0.50% CaO, 1.80% moisture,
36.0% $CO_2$, 57.0% loss on ignition)
Tri-magnesium orthophosphate octahydrate, 5.59
$Mg_3(PO_4)_2.8H_2O$ from Stauffer
Chemical Company
ONCOR ® 75 RA (trademark of National 1.49
Lead [NL] Industrial Chemicals for
high temperature reaction product
of metal silicate and antimony,
antimony content, calculated as
$Sb_2O_3$, 25%, average particle size:
6 micrometers)
Vinylidene chloride/butadiene latex 15.65
(48% solids; pH: 8.0; Brookfield
viscosity: 50 cps; particle size:
0.14 micrometers; chlorine in
polymer: 36%; specific gravity:
1.13; "XD-30208.01" latex of
Dow Chemical Company)
SURFYNOL ® TG (trademark of Air Products 0.37
Company for nonionic surfactant
comprising an acetylenic glycol
blend in ethylene glycol)

In preparing Part B, the hydroxyethyl cellulose is dissolved completely in the water before the magnesium carbonate, tri-magnesium orthophosphate, and ONCOR ® fire retardant are added; the mixture of the thickened water, the magnesium salts, and the fire retardant is then blended to form a uniform dispersion before adding the latex and the acetylenic glycol nonionic surfactant.

EXAMPLE 2

Use of Part A/B Binder with Perlite

The perlite used in this Example is sold under the designation Number 2A by Silbrico Corporation and has an apparent density of 7.5 lbs. per cubic foot (0.12 g/cc). The two-part system of Example 1, blended 1:1 by volume and diluted 3:2 by volume with water, as explained in Example 1 was added to the perlite in the amount of 5 gallons (19 liters) to 2.5 cubic feet (71 liters) of perlite. The thus-moistened perlite compacted to a density of about 0.15 g/cc. The perlite/binder mixture was sprayable. A sprayed coating hardened in 4 hours and had rain resistance after 16 hours of drying and curing at normal ambient temperatures.

EXAMPLES 3-7 and 8A

The Part A used in this Example was similar to that of Examples 1 and 2; see the formula which follows. In the Part B formulas also given below, ingredients are listed in the order of addition. In these formulas, the terms NATROSOL ® 250 HHR, ONCOR ® 75 RA, "XD-30208.01" Latex, and SURFYNOL ® TG have the meanings indicated in Example 1. The magnesium carbonate and tri-magnesium orthophosphate octahydrate are the same ingredients as set forth in Example 1. The ingredients new to this Example are more completely identified below:

FIREBRAKE ® ZB: trademark of U.S. Borax for fire-retardant zinc borate of the formula 2 $ZnO.3B_2O_3.3.5H_2O$, −325 mesh particles.

Basic zinc carbonate: white crystalline powder supplied by Mineral Research and Development Corporation, typical analysis: Zn, 58.0%; Fe, 0.008%; $SO_4$, trace; Cl, 0.35%; heavy metals (as Pb), 0.0025%.

| Part A for Examples 3–8A | |
|---|---|
| Ingredient | Weight % |
| Aqueous sodium silicate (see Example 1) | 81.27 |
| Water ground mica | 18.33 |
| Zinc oxide (KADOX ® 15; see Example 1) | 0.15 |
| Zinc stearate (METASAP ® Zinc Stearate H; see Example 1) | 0.25 |

The weight ratio of Part A to Part B is given as the last horizontal row of numbers in the Table of Part B formulas.

PART B FORMULAS FOR EXAMPLES 3-8A
IN WEIGHT-PERCENT

| Ingredient | Example 3 | 4 | 5 | 6 | 7 | 8-A |
|---|---|---|---|---|---|---|
| Water | 73.92 | 67.04 | 67.06 | 67.04 | 67.04 | 67.04 |
| Hydroxyethyl cellulose (NATROSOL ® 250 HHR) | 0.62 | 0.56 | 0.52 | 0.56 | 0.56 | 0.56 |
| Magnesium carbonate | — | 9.31 | 9.31 | — | 11.17 | 7.45 |
| Tri-magnesium orthophosphate | 6.16 | — | 5.59 | 5.59 | 3.72 | — |
| Zinc borate (FIREBRAKE ® ZB) | — | 5.59 | — | — | — | 7.45 |
| Zinc carbonate | — | — | — | 9.31 | — | — |
| Antimony-containing fire-retardant (ONCOR ® 75 RA) | 1.64 | 1.49 | 1.49 | 1.49 | 1.49 | 1.49 |
| Rubber latex (XD 30208.01) | 17.25 | 15.64 | 15.65 | 15.64 | 15.64 | 15.64 |
| Nonionic surfactant (SURFYNOL ® TG) | 0.41 | 0.37 | 0.37 | 0.37 | 0.37 | 0.37 |
| A/B ratio (by weight) | 1.34 | 1.22 | 1.22 | 1.22 | 1.22 | 1.22 |

The performance of the binders of Examples 3-8A is evaluated below. The abbreviation "Excl" means "excellent".

| Property Measured or Evaluated | Example 3 | 4 | 5 | 6 | 7 | 8A |
|---|---|---|---|---|---|---|
| Pot life, min. | 55 | 42 | 46 | 63 | 83 | 40 |
| Film water resistance after: | | | | | | |
| (a) 24 hours* | Poor | Fair | Good | Fair | Fair | Poor |
| (b) 48 hours* | Fair | Good | Excl | Fair | Good | Poor |
| (c) 96 hours* | Fair | | | | Excl | Good |
| (d) 14 days* | | Good | Excl | Excl | Excl | Good |
| (e) hot cure: 427° C./4 hours | Excl | Excl | Excl | Excl | Excl | Excl |
| Barcol hardness of 12.7 mm-thick sample (top/bottom) after 14 days cure* | 70/70 | 52/10 | 52/52 | 4/0 | 51/43 | 0/0 |

*Normal ambient (room temperature) curing conditions

Example 3 performed reasonably well in hardness development without any carbonate; its water resistance development, however, was slow. Zinc borate proved to be a reasonably adequate substitute for magnesium phosphate in Example 4, but this apparent success could not be repeated with different ratios in Example 8A. The best overall performance was obtained with a magnesium carbonate/magnesium phosphate cocurative combination; see Examples 5 and 7, particularly Example 5. Zinc carbonate proved to be a reasonably adequate substitute for magnesium carbonate for the moisture resistance development of Example 6, but the magnesium phosphate/zinc carbonate cocurative system appeared to provide very poor hardness development. These results suggest a synergistic effect or some other unusual cooperation between (1) magnesium phosphate or zinc borate and (2) magnesium carbonate.

EXAMPLES 8B and 8C

In these Examples, Part A was the same as for Examples 3–7. In the Part B formulas, certain components were varied from Examples 3–7, i.e. omission of latex (see Example 8B), and omission of the hardness-developing cocurative, i.e. the phosphate or borate (see Example 8C).

| Part B Formulas for Examples 8B and 8C in Weight-Percent | | |
|---|---|---|
| | Example | |
| Ingredient | 8B | 8C |
| Water | 82.62 | 67.04 |
| Hydroxyethyl cellulose (NATROSOL® 250 HHR) | 0.61 | 0.56 |
| Magnesium carbonate | 10.22 | 14.90 |
| Tri-magnesium orthophosphate | 6.13 | — |
| Zinc borate (FIREBRAKE® ZB) | — | — |
| Antimony-containing fire-retardant (ONCOR® 75 RA) | — | 1.49 |
| Rubber latex (XD30208.01) | — | 15.64 |
| Nonionic surfactant (SURFYNOL® TG) | 0.41 | 0.37 |
| A/B ratio (by weight) | 1.34 | 1.22 |

| The performance of these binders was as follows. | | |
|---|---|---|
| Property | Example 8B | Example C |
| Pot life | 60 minutes | more than 8 hours |
| Film water resistance after: | | |
| 24 hours* | | Poor |
| 48 hours* | Poor | Poor |
| 96 hours* | | Poor |
| 14 days* | Poor | |
| Hot cure: 427° C./4 hours | Excellent | Excellent |
| Barcol hardness of 12.7 mm-thick sample (top/bottom) after 14 days cure* | 20/10 | 25/0 |

*Normal ambient (room temperature) curing conditions

EXAMPLE 9

The Part A formula was the same as for Examples 3–7 and 8A, 8B, and 8C. The Part A/Part B ratio was 1.22:1 (with no ZnO in Part B), 1.21:1 (with 0.74 weight-% ZnO in Part B), or 1.20:1 (with 1.47 weight-% ZnO in Part B).

The basic two-part binder formula for Example 9 is given below. All ingredients, unless otherwise indicated, are the same as for Examples 3–7, 8A, 8B, and 8C.

| Part A: (see Examples 3–7 and 8A–8C) 327.3 parts by weight. | | |
|---|---|---|
| Part B: 268.6 parts by weight | | |
| Ingredient | Parts by Wt. | Wt. % |
| Water | 180.0 | 67.01 |
| Hydroxyethyl cellulose (NATROSOL® 250 HHR) | 1.6 | 0.60 |
| Magnesium carbonate | 25.0 | 9.31 |
| Tri-magnesium orthophosphate | 15.0 | 5.58 |
| Antimonic fire-retardant (ONCOR® 75 RA) | 4.0 | 1.49 |
| Rubber latex (XD-30208.01) | 42.0 | 15.64 |
| Nonionic surfactant (SURFYNOL® TG) | 1.0 | 0.37 |

The volumetric A/B ratio was 1:1. The Example 9 binder had a pot life in excess of 40 minutes; its gel time was 60 to 70 minutes. When 2 volumes combined A-B binder was diluted with 2.5 volumes of water, the Brookfield viscosity was found to be 40 centipoises (cps). A water spot test was used to determine water resistance. A 20-mil (510 micrometer) wet film of the binder was allowed to dry and cure for 18 to 20 hours. Water-soaked cotton was then applied to the film, and the tim required for the water spot to soften the film was measured in hours. In the case of the basic two-part formula given above, the "time to soften" in the water spot test was 1.25 hours. When 2.0 parts by weight (0.74 weight-% of the thus-modified Part B) of zinc oxide (KADOX® 15) was added to Part B of the basic two-part formula, viscosity was lowered slightly (to 30 cps), gel time was unaffected, but the "time to soften" in the water spot test was increased dramatically to 6 hours, demonstrating that zinc oxide in both Parts A and B is a useful ingredient in combination with a cocurative system of this invention. The foregoing results (viscosity, gel time, water spot test) were essentially the same with a 4.0-part addition of zinc oxide (1.47 weight-%); indeed, there appeared to be no important advantage in increasing the ZnO level in Part B beyond 1 weight-%.

Further experiments with a polychloroprene (neoprene) latex (47% solids) demonstrated that this latex could be substituted for the XD-30208.01 with good results. Gel time was unaffected, viscosities were usefully higher (80–120 cps, depending on the ZnO level in Part B), and the "time to soften" in the water spot test was somewhat lowered (0.75–3 hours, depending on the ZnO level in Part B).

The foregoing Examples are believed to provide evidence in support of the selection of cocuratives from the carbonates, phosphates, and borates of zinc and magnesium, preferably at least one of these salts being a magnesium salt. Additional experiments have demonstrated that condensed phosphates such as the pyrophosphates are among the useful phosphates. This invention is not bound by any theory, but it is believed that the contribution of the zinc oxide to improved water resistance may be due to interaction of this compound with functional groups of the rubbery latex solids.

The Example 9 binder was coated onto a bare mild steel plate, cured at room temperture overnight, and heat treated with gradually increasing heat up to 950° F. (510° C.). After allowing the coating to cool back down to ambient temperature, no bond failure was observed, and the coating remained adhered to the plate. Good adherence to aluminum, wood, galvanized steel, and concrete was also obtained with this formula. The Example 9 binder showed excellent corrosion protection for steel (5 mil [0.127 mm] dry coating on bare mild steel), even in the salt spray test (ASTM B-117) and in nitric acid and sulfuric acid vapor tests.

What is claimed is:

1. An aqueous silicate composition which is curable at room temperature and which comprises:
   (a) an aqueous solution or colloidal dispersion of an alkali metal silicate;

(b) an aqueous latex comprising elastomeric latex particles stably distributed in an aqueous medium;

(c) at least one metal salt of a divalent metal, said metal salt being a coreactant for said alkali metal silicate at room temperature, having a reactivity with alkali metal silicates at least equal to the cations of metals of Group II, A or B, of the Periodic Table, and having a water solubility ranging from about $10^{-1}$ to $10^{-4}$ weight-% at a pH of 7 and room temperature; provided that:

if said water solubility is greater than $10^{-2}$ weight-%, any divalent metal cation of said metal salt is less reactive with alkali metal silicates than $Ca^{++}$, and if said water solubility is less than $10^{-3}$ weight-%, a divalent cation of said metal salt is more reactive with alkali metal silicates than $-325$ U.S. mesh ZnO;

said component (c) being selected to provide a sufficiently complete curing of said alkali metal silicate to impart, to a 10 mm-thick coating of said composition after 14 days of curing at room temperature, water resistance and a Barcol hardness of at least 10 at the exposed or top surface of the coating; said component (c) also being selected to permit a pot life for said composition of at least 15 minutes at room temperature.

2. An aqueous silicate composition according to claim 1 wherein said component (c) includes a phosphate salt.

3. An aqueous silicate composition according to claim 1 wherein said component (c) comprises a plurality of salts of Group II, A or B, of the Periodic Table, at least one of said salts being a magnesium salt.

4. An aqueous silicate composition according to claim 1 wherein said component (c) includes a salt of the formula $Mg_3(PO_4)_2 \cdot xH_2O$, wherein x is a number ranging from 0 to 8, said salt having a water solubility at room temperature which is greater than $10^{-3}$ weight-% but less than $10^{-1}$ weight-%.

5. A curable composition according to claim 1 wherein said component (a) comprises a colloidal dispersion of a sodium or potassium silicate of the formula $M_2O \cdot nSiO_2$, wherein M represents sodium or potassium and n is a number of moles ranging from 1.6 to about 4.

6. A composition according to claim 5 wherein said component (c) comprises a combination of a carbonate salt and a phosphate salt, at least one of said salts being a salt of magnesium.

7. A cured layer at least about 1.5 mm. thick on a substrate wherein the layer comprises the composition of claim 1 which has been cured to a crosslinked solid upon the substrate.

8. An aqueous silicate composition according to claim 1 which dries and cures to a solid, crosslinked mass at room temperature, said composition comprising:

(a) an aqueous colloidal dispersion comprising about 5 to about 65% by weight of a dispersed colloidal silicate of the formula $M_2O \cdot nSiO_2$, wherein M represents sodium or potassium and n is a number of moles ranging from about 1.6 to about 4;

(b) about 5 to about 25 parts by weight, per 100 parts by weight of said aqueous colloidal dispersion, of an aqueous latex comprising about 10 to about 80% by weight of elastomeric latex particles stably distributed in an aqueous medium;

(c) about 1 to about 50 parts by weight, per 100 parts by weight of said aqueous colloidal dispersion, of tri-magnesium phosphate;

(1) about 1 to about 50 parts by weight, per 100 parts by weight of said aqueous colloidal dispersion, of magnesium carbonate; and (e) an amount of water sufficient to make said aqueous silicate composition sprayable.

9. A cured coating on a substrate comprising the composition of claim 1 which has been coated onto and cured upon said substrate.

10. A method of applying an insulative, fireretardant coating to a substrate comprising the steps of:

(a) blending the composition of claim 1 with a non-flammable inorganic filler to obtain a sprayable coating composition;

(b) spraying said sprayable coating composition onto a substrate to form a coating thereon; and (c) permitting the resulting coating to dry and cure for at least 16 hours at ambient temperatures.

11. A two-part curable composition which is curable at room temperature when the two parts are blended together, said composition comprising:

in a first part, an aqueous solution or dispersion of an alkali metal silicate, in a second part, a coreactant for said alkali metal silicate comprising a phosphate salt of a divalent metal of Group II of the Periodic Table, said phosphate salt having a water solubility ranging from $10^{-1}$ to $10^{-4}$ weight-% at room temperature; provided that:

if said water solubility is greater than $10^{-2}$ weight-%, any divalent metal cation of said metal salt is less reactive with alkali metal silicates than $Ca^{++}$, and if said water solubility is less than $10^{-3}$ weight-%, a divalent cation of said metal salt is more reactive with alkali metal silicates than $-325$ U.S. mesh ZnO;

said coreactant being selected to provide a sufficiently complete curing of said alkali metal silicate to impart, to a 10 mm-thick coating of said composition after 14 days of curing at room temperature, water resistance and a Barcol hardness of at least 10 at the exposed or top surface of the coating; said coreactant also being selected to permit a pot life for said composition of at least 15 minutes at room temperature.

12. A two-part composition according to claim 11 wherein said phosphate salt is an orthophosphate.

13. A two-part composition according to claim 11 wherein said coreactant comprises the combination of a tri-magnesium phosphate hydrate with magnesium carbonate.

14. A two-part composition according to claim 11 which further includes an aqueous elastomer latex in at least one of the two parts.

15. A two-part composition according to claim 11 comprising:

in the first part, an aqueous colloidal dispersion comprising about 5 to about 65% by weight of a dispersed colloidal silicate of the formula $M_2O \cdot nSiO_2$, wherein M represents sodium or potassium and n is a number of moles ranging from about 1.6 to about 4;

in the second part, about 1 to about 50 parts by weight of magnesium carbonate, on the basis of each 100 parts by weight of the aqueous colloidal dispersion in said first part, and about 1 to about 50 parts by weight, on the same basis, of tribasic magnesium phosphate; and an amount of water in said second part which is sufficient to make said two-part composition sprayable when the two parts have been blended together.

16. A method for applying an insulative, fireretardant coating to a substrate comprising the steps of:
(a) blending together the first and second parts of the composition of claim 11, and blending the resulting curable mixture with a nonflammable inorganic filler to obtain a sprayable coating composition;
(b) spraying said sprayable coating composition onto a substrate to form a coating thereon; and
(c) drying and curing the resulting coating for at least about 16 hours at ambient temperatures.

17. An aqueous silicate composition which is curable at room temperature and which comprises:
(a) an aqueous solution or colloidal dispersion of an alkali metal silicate;
(b) a combination of a divalent metal carbonate and a divalent metal phosphate or borate, wherein said metal salts are coreactants for said alkali metal silicate at room temperature, having a reactivity with alkali metal silicates at least equal to the cations of metals of Group II, A or B, of the Periodic Table, and having a water solubility ranging from about $10^{-1}$ to $10^{-4}$ weight-% at a pH of 7 and room temperature; provided that:
if said water solubility is greater than $10^{-2}$ weight-%, any divalent metal cation of said metal salts is less reactive with alkali metal silicates than $Ca^{++}$, and
if said water solubility is less than $10^{-3}$ weight-%, a divalent cation of said metal salts is more reactive with alkali metal silicates than $-325$ U.S. mesh ZnO;
said component (b) being selected to provide a sufficiently complete curing of said alkali metal silicate to impart, to a 10 mm-thick coating of said composition after 14 days of curing at room temperature, water resistance and a Barcol hardness of at least 10 at the exposed or top surface of the coating; said component (b) also being selected to permit a pot life for said composition of at least 15 minutes at room temperature.

18. An aqueous silicate insulation composition which is curable at room temperature and which comprises:
(a) an aqueous solution or colloidal dispersion of an alkali metal silicate;
(b) a combination of a divalent metal carbonate and a divalent metal phosphate or borate, wherein said metal salts are coreactants for said alkali metal silicate at room temperature, having a reactivity with alkali metal silicates at least equal to the cations of metals of Group II, A or B, of the Periodic Table, and having a water solubility ranging from about $10^{-1}$ to $10^{-4}$ weight-% at a pH of 7 and room temperature; provided that:
if said water solubility is greater than $10^{-2}$ weight-%, any divalent metal cation of said metal salts is less reactive with alkali metal silicates than $Ca^{++}$, and
if said water solubility is less than $10^{-3}$ weight-%, a divalent cation of said metal salts is more reactive with alkali metal silicates than $-325$ U.S. mesh ZnO;
said component (b) being selected to provide a sufficiently complete curing of said alkali metal silicate to impart, to a 10 mm-thick coating of said composition after 14 days of curing at room temperature, water resistance and a Barcol hardness of at least 10 at the exposed or top surface of the coating; said component (b) also being selected to permit a pot life for said composition of at least 15 minutes at room temperature, and
(c) a filler comprising a particulate aggregate.

19. The composition of claim 17 or 18 wherein the divalent metal phosphate of component (b) comprises magnesium phosphate.

20. The composition of claim 17 or 18 wherein the divalent metal phosphate of component (b) comprises zinc phosphate.

21. The composition of claim 17 or 18 wherein the divalent metal phosphate of component (b) comprises a divalent metal pyrophosphate.

22. The composition of claim 17 or 18 wherein the divalent metal phosphate of component (b) comprises a divalent metal orthophosphate.

23. The composition of claim 17 or 18 wherein the divalent metal phosphate of component (b) comprises zinc pyrophosphate.

24. The composition of claim 17 or 18 wherein the divalent metal phosphate of component (b) comprises $Mg_3(PO_4)_2 \cdot XH_2O$, wherein X is a number ranging from 0 to 8, said salt having a water solubility at room temperature which is greater than $10^{-3}$ weight-% but less than $10^{-1}$ weight-%.

25. The composition of claim 17 or 18 wherein the divalent metal borate of component (b) comprises magnesium borate.

26. The composition of claim 17 or 18 wherein the divalent metal borate of component (b) comprises zinc borate.

27. The composition of claim 17 or 18 wherein the divalent metal carbonate of component (b) comprises magnesium carbonate.

28. The composition of claim 17 or 18 wherein the divalent metal carbonate of component (b) comprises zinc carbonate.

29. The composition of claim 17 or 18 wherein the combination of divalent metal carbonate and divalent metal phosphate or borate in component (b) comprises a trimagnesium phosphate hydrate and magnesium carbonate.

30. The composition of claim 17 or 18 wherein the combination of divalent metal carbonate and divalent metal phosphate or borate in component (b) comprises magnesium carbonate and zinc borate.

31. The composition of claim 17 or 18 wherein component (a) comprises a colloidal dispersion of a sodium or potassium silicate of the formula $M_2O \cdot nSiO_2$, wherein M represents sodium or potassium and n is a number of moles ranging from 1.6 to about 4.

32. The composition of claim 17 or 18 which further comprises an aqueous latex comprising elastomeric latex particles stably distributed in an aqueous medium.

33. The composition of claim 17 or 18 wherein:
component (a) comprises an aqueous colloidal dispersion comprising about 5 to about 65% by weight of a dispersed colloidal silicate of the formula $M_2O \cdot nSiO_2$, wherein M represents sodium or potassium and n is a number of moles ranging from about 1.6 to about 4;
component (b) comprises about 1 to about 50 parts by weight of magnesium carbonate, on the basis of each 100 parts by weight of the aqueous colloidal dispersion in component (a), and about 1 to about 50 parts by weight, on the same basis, of tribasic magnesium phosphate; and an amount of water in component (b) which is sufficient to make said composition sprayable when the parts have been blended together.

34. A coating composition which dries and cures to a solid, crosslinked mass at room temperature, which comprises:
  (a) an aqueous colloidal dispersion comprising about 5 to about 65% by weight of a dispersed colloidal silicate of the formula $M_2O \cdot nSiO_2$, wherein M represents sodium or potassium and n is a number of moles ranging from about 1.6 to about 4;
  (b) about 5 to about 25 parts by weight, per 100 parts by weight of said aqueous colloidal dispersion, of an aqueous latex comprising about 10 to about 80% by weight of elastomeric latex particles stably distributed in an aqueous medium;
  (c) about 1 to about 50 parts by weight, per 100 parts by weight of said aqueous colloidal dispersion, of trimagnesium phosphate;
  (d) about 1 to about 50 parts by weight, per 100 parts by weight of said aqueous colloidal dispersion, of magnesium carbonate; and
  (e) an amount of water sufficient to make said aqueous silicate composition sprayable.

35. The composition of claim 17, 18, or 34 which further comprises an amount of ZnO sufficient to impart additional water resistance to the composition when cured.

36. A method of applying an insulative, fire-retardant coating to a substrate which comprises the steps of:
  (a) blending the composition of claim 19 or 36 with a non-flammable inorganic filler to obtain a sprayable coating composition;
  (b) spraying said sprayable coating composition onto a substrate to form a coating thereon; and
  (c) permitting the resulting coating to dry and cure for at least 16 hours at ambient temperatures.

37. A cured coating on a substrate comprising the composition of claim 17, 18, or 34 which has been coated onto and cured upon said substrate.

38. A cured layer on a substrate wherein the layer is at least about 1.5 mm thick and comprises the composition of claim 17, 18, or 34 which has been cured to a crosslinked solid upon the substrate.

39. The composition of claim 18 wherein the inorganic aggregate comprises an inorganic aggregate.

40. The composition of claim 18 wherein the inorganic aggregate comprises cellulosic material.

41. The composition of claim 39 wherein the inorganic aggregate comprises an expanded rock.

42. The composition of claim 39 wherein the inorganic aggregate comprises perlite.

43. The composition of claim 39 wherein the inorganic aggregate comprises vermiculite.

44. The composition of claim 39 wherein the inorganic aggregate comprises mineral wool.

45. The composition of claim 39 wherein the inorganic aggregate comprises glass foam.

46. The composition of claim 39 wherein the inorganic aggregate comprises glass fibers.

47. The composition of claim 18 wherein the aggregate comprises an aggregate having a particulate size suitable for spraying.

48. The composition of claim 47 wherein the aggregate having a particulate size suitable for spraying comprises an aggregate having a particulate mesh size of about −4 mesh to −8+100 mesh, and having a bulk or apparent density less than about 0.4 grams/cc.

49. A method of applying an insulation coating wherein the particulate aggregate of claim 18 is cosprayed.

* * * * *